J. B. ALLFREE.
CHAIN DRIVE MOTOR.
APPLICATION FILED NOV. 25, 1916.
1,222,588.
Patented Apr. 17, 1917.
2 SHEETS—SHEET 1.
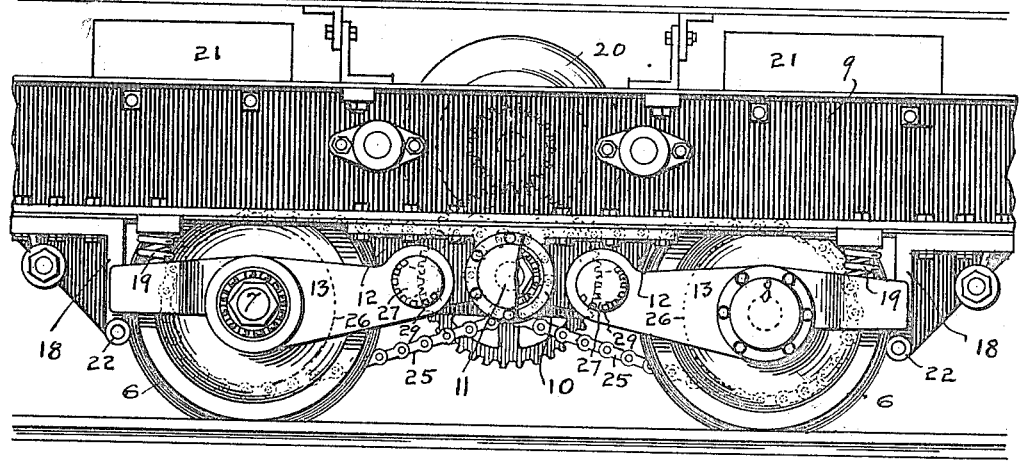
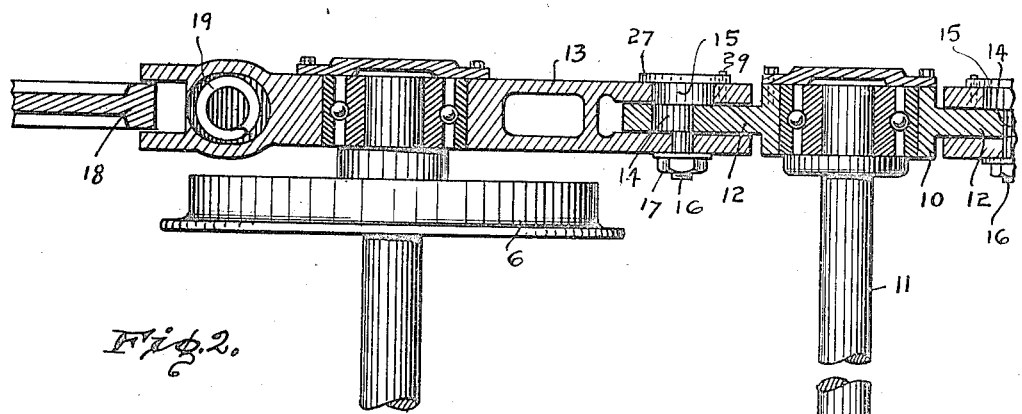
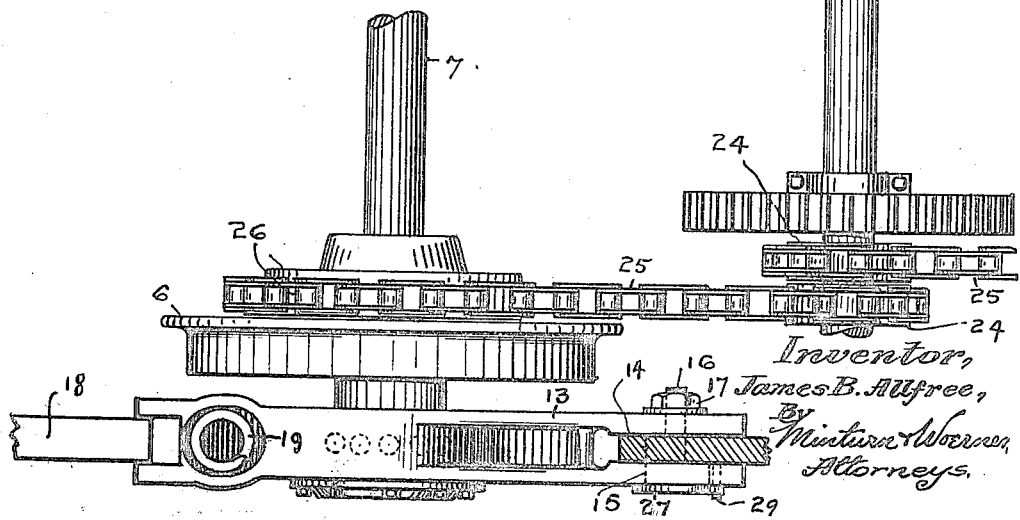
Inventor,
James B. Allfree,
By Minturn & Werner,
Attorneys.

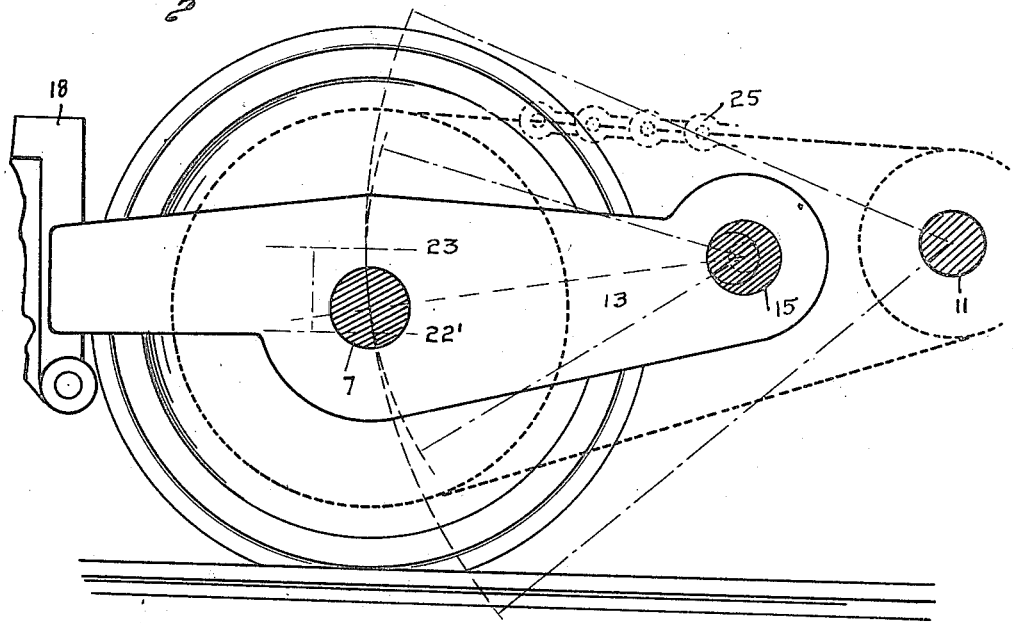
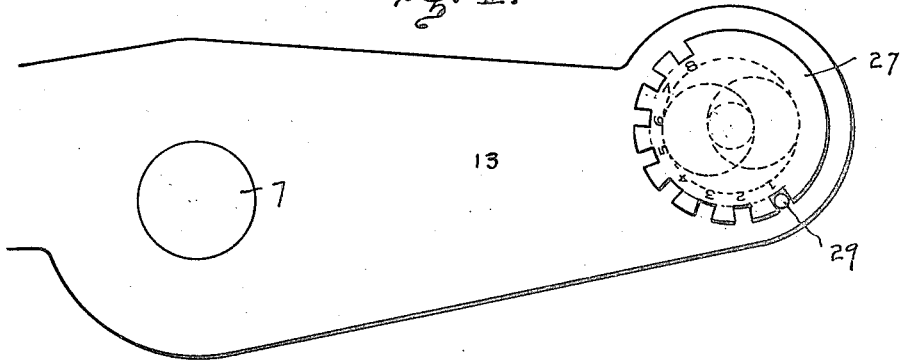

UNITED STATES PATENT OFFICE.

JAMES B. ALLFREE, OF CHICAGO, ILLINOIS.

CHAIN-DRIVE MOTOR.

1,222,588.      Specification of Letters Patent.      Patented Apr. 17, 1917.

Application filed November 25, 1916. Serial No. 133,441.

*To all whom it may concern:*

Be it known that I, JAMES B. ALLFREE, a citizen of the United States, residing at Chicago, in the county of Cook and State of Illinois, have invented certain new and useful Improvements in Chain-Drive Motors, of which the following is a specification.

This invention relates to improvements in traction motors for drawing loads in mining, logging, construction and other work where the roadway which is generally provided with a track is abruptly uneven as to the individual rails and relatively to each other as to the two rails, and which is full of short curves necessitating a short motor. On account of its greater flexibility than gears, a chain drive is more desirable than the latter.

The object of my invention is to transmit power from an electric motor or other suitable source of power to the traction wheels through link belts which will not be bound or cramped and the advantages of their flexibility lost by the restraint of associated parts.

Another object of my invention is to make the rise and fall of the traction wheels occasioned by the unevenness of the track oscillatory movements practically about the axis of the driving sprockets to prevent the loosening of the link belts, and another object is to so locate the actual center of oscillation far enough away from the axis of the driving sprockets as to allow for required dismemberment and disconnection for repairs or adjustments to tighten the belts as they stretch from use, easily and without disturbing the driving sprockets.

I accomplish the above principal objects and other subordinate ones which will hereinafter appear, by the mechanism illustrated in the accompanying drawings, in which—

Figure 1 is a view in side elevation of the major portion of a tractor embodying my invention. Fig. 2 is a plan and partial horizontal section of the jack-shaft and an axle and its pair of wheels with my invention applied thereto. Fig. 3 is a vertical section showing a traction wheel and axle and arm swinging same and illustrates diagrammatically the slight variation between the theoretical and actual arcs of oscillation of the wheel axis. Fig. 4 is an elevation of the arm oscillatively connecting the axle shown in Fig. 3, enlarged in scale to illustrate the eccentric adjustment and lock for varying the effective length of said arm and Fig. 5 is a detached view of the eccentric pin.

Like characters of reference indicate like parts throughout the several views of the drawings.

The tractor is mounted on four wheels 6, 6, 6, 6, which are mounted in pairs on two axles 7 and 8. 9 is the tractor-body depending from opposite sides of which are brackets in which are journals 10 in which a jack-shaft 11 is mounted on suitable bearings, here shown as ball-bearings. The brackets also have vertical flanges 12 on diametrically opposite sides and at right angles to the jack-shaft. These flanges each have a round transverse hole which receive pins that attach the respective arms 13, to the flanges. The axles 7 and 8 are journaled, here shown as in ball bearings, in suitable openings for the purpose formed in suitable pairs of said arms, as shown. The end of each arm next to flange 12, is bifurcated and receives the flange between the two members formed by the bifurcation. The pin connecting the arm with its flange at the joints just described, is of the shape shown in Figs. 2 and 5, wherein a middle portion 14 makes a working fit in the round hole in the flange and is eccentric to the outer portion 15 of greater diameter and inner portion 16, of less diameter. This difference in diameter is to enable the pin to be inserted from the outer side of the arm. The inner and smallest portion 16 is threaded to receive a retaining nut 17. The diameter of the cam-portion or eccentric 16 is approximately equal to the length of one of the links of the link-belt transmission, presently to be described. Each arm 13 extends on the other side of its journal for the axle which supports it, and the end of this extension is bifurcated as shown in Fig. 2, to receive a guide-bracket 18, fixed to the body 9. The arm has a spring-pocket for the bearing of a spring 19, which elastically supports the body 9. The body 9 and its load, comprising principally a motor 20 and storage batteries 21 to supply the motor with current, are thus supported on both ends of each of the four arms 13, through flanges 12 at their inner ends and springs 19 at their outer ends.

The guide-brackets 18 have stops 22 which limit the downward swing of the outer ends of the arms, as when the body 9 is not loaded, but when it has its normal load the arms are raised clear of said stops. The arc or maximum range of movement of each traction wheel allowed for unevenness of track, is indicated diagrammatically in Fig. 3 and is between the parallel lines 22' and 23, shown in said figure. The arcs of two circles are here shown, one of which is described from the axis of the jack-shaft as a center and theoretically should be the center of oscillation of the traction wheel to keep the link-belt tight which transmits power to its axle, and the other arc is described from the axis of the pin securing arm 13 to its bracket with a radius from there to the center of the axle. It will be noted that between the required limits of movement as from 22' to 23 of Fig. 3 the arcs coincide for all practical purposes. This enables me to oscillate the arm 13 about a center at one side of the axis of the jack-shaft and use a link-belt drive, without any lengthening or shortening of the belt, practically speaking, due to the rise and fall of the traction wheel in moving over a rough track.

The jack-shaft is driven by cogged gears shown in Fig. 1, from the motor shaft. Mounted on the jack-shaft are sprocket wheels 24, 24, which are drivingly connected by link belts 25, 25, with sprocket wheels 26, 26, on the respective axles 7 and 8. Any stretch in the belts due to use is easily taken up by shifting the rotary positions of the concentric ends of the pins attaching arms 13 with their brackets at their inner ends. Given positions of the pins are held by providing the outer ends of their outer members 15 each with an annular flange 27, with notches, here numbered from 1 to 8, inclusive, to successively receive a pin 29 seated in the arm 13. This forms a lock which may be unlocked for resetting the cams by loosening the nut 17 sufficiently, and by then sliding the bolt out lengthwise until the notched flange 27 clears the end of the pin. The cam carrying pin can then be partially rotated, and to enable said pins for corresponding arms on both sides of the body 9 to be similarly set I number the notches as shown so the locking pins 29 of each arm may be set in the notches of the same numbers. By means of the cams the arms 13 may be gradually lengthened as the belt stretches until the length of an entire link has been added, and thereupon, a link will be removed from the belt and the cams set back to notch No. 1.

Attention is called to the wide separation of the two springs 19, 19, on each side of the tractor, giving a correspondingly broad support to said body on its running gear, which prevents teetering of the load and increases the easy riding qualities and consequent durability of the tractor on rough roads.

It will be understood that I have here shown and described the preferred form of my invention with the axes of oscillation of the arms supporting the axles far enough removed from the axis of rotation of the driving sprocket to enable their pivotal pins to be manipulated without disturbing the parts assembled on said axis and still near enough to the latter to practically avoid loosening the belt by the oscillatory movement of the axles. It is within the scope of my invention to oscillate the axles about the exact axis of rotation of the driving sprockets, with or without means for varying the lengths of the arms to take up the slack in the belts, and also to substitute cog gears wheels in a suitable train from the driving shaft to the axles in place of the belt transmission, for, as stated at the outset, the belt transmission is only preferable because of its greater flexibility.

Obviously it is within the scope of my invention to substitute shafts for the train of gears, extending radially from the driving shaft to the axles and connected with both of the latter by bevel gears.

While I have described my invention with more or less minuteness as regards details of construction and arrangement and as being embodied in certain precise forms, I do not desire to be limited thereto unduly or any more than is pointed out in the claims. On the contrary, I contemplate all proper changes in form, construction and arrangement, the omission of immaterial elements and the substitution of equivalents as circumstances may suggest or as necessity may render expedient.

I claim—

1. In a tractor, a driving sprocket wheel, a pair of traction wheels, a driven sprocket wheel, a link-belt connecting the two sprocket wheels, and means when the traction wheels rise and fall due to unevenness of track, to move them oscillatively about a center located between the axis of rotation of the traction wheels and the axis of rotation of the driving sprocket, and means to tighten the belt by increasing the distance between the driving and driven sprocket wheels.

2. In a tractor having wheels mounted on axles, a frame comprising arms having oscillatory supports at one end and axle bearings at the other, and means for varying the distance between the axes of oscillation and axle rotation.

3. In a tractor, a pair of traction wheels and a driven sprocket wheel rotating about the same axis, a driving sprocket wheel, a link belt connecting the two sprocket wheels, and arm means swingingly supported adjacent to the axis of the driving sprocket wheel and supporting the traction wheels and driven sprocket wheel and means for varying the distance between the driving and driven sprocket wheels.

4. In a tractor, a driving sprocket, an axle, a driven sprocket mounted in a fixed manner on the axle, a pair of traction wheels also mounted in a fixed manner on the axle, a link-belt connecting the two sprocket wheels, and arms supporting the axle, said arms being pivoted between the axle and axis of rotation of the driving sprocket close to but sufficiently remote from the latter for easy disconnection and adjustment and means located at said pivots for varying the distance between the driving and driven sprocket wheels.

5. In a tractor, a driving sprocket, an axle, a driven sprocket mounted in a fixed manner on the axle, a pair of traction wheels also mounted in a fixed manner on the axle, a link-belt connecting the two sprocket wheels, arms supporting the axle, said arms being pivoted between the axle and axis of rotation of the driving sprocket, and pivot pins on which the arms are pivoted having cam-means for varying the effective lengths of the arms to tighten the belt by rotating the pins.

6. In a tractor, a driving sprocket, an axle, a driven sprocket mounted in a fixed manner on the axle, a pair of traction wheels also mounted in a fixed manner on the axle, a link-belt connecting the two sprocket wheels, arms supporting the axle said arms being pivoted between the axle and axis of rotation of the driving sprocket, pivot pins on which the arms are pivoted having cam-means for varying the effective lengths of the arms to tighten the belt by rotating the pins, and means for locking the pins at given positions.

7. In a tractor, a driving sprocket, an axle, a driven sprocket mounted in a fixed manner on the axle, a pair of traction wheels also mounted in a fixed manner on the axle, a link-belt connecting the two sprocket wheels, a pair of arms one on each side of the tractor supporting the axle said arms being pivoted between the axle and the axis of rotation of the driving sprocket, pivot pins on which the arms are pivoted having cam-means for varying the effective lengths of the arms to tighten the belt by rotating the pins, means for obtaining like positions of the pins for both arms of the pair, and means for locking the pins at given positions.

8. In a tractor, a body a pair of parallel arms one on each side of the body, means comprising hangers and pivotal connections therewith for supporting the inner ends of the arms from the body, means for elastically supporting the body upon the outer ends of the arms, an axle supported by the arms intermediate of the ends of the arms, and traction wheels mounted on the axle, means for varying the distance between the axes of the pivots and axle, and means for designating like adjustments for both arms of a pair.

9. In a tractor, a body having middle depending members, a pair of arms one on each side of the body, pivots connecting an end of each arm to its adjacent one of said members, springs supporting the body above and upon the other ends of said members, means for guiding and limiting the movement of said last ends, an axle supported by the arms intermediate their ends and traction wheels mounted on the axle.

10. In a tractor, a body, a motor mounted in the body, a jack-shaft driven from the motor, journals depending from the body in which the jack-shaft is mounted said journals having flange extension each with a round hole therethrough, a pair of arms one on each side of the tractor a pin for each arm passing through their respective arms near the ends of the arms at which ends the arms are bifurcated and receive the adjacent flange extensions between their members, said pins also passing through the hole in the flange, the pins each being in outer and inner concentric portions with an eccentric portion between them, the concentric portions being of different diameters and fitting corresponding openings in the two members of the arm and the middle portion fitting the hole in the flange, means for locking the pins against rotation, an axle journaled in the pair of arms, a pair of traction wheels mounted in a fixed manner on the axle, a sprocket wheel mounted on the jack-shaft and a sprocket wheel mounted on the axle and a link-belt connecting the two sprocket wheels.

11. In a tractor, driving sprocket wheels, a pair of axles, traction wheels on said axles, a driven sprocket wheel for each axle, means when the traction wheels rise and fall due to unevenness of track to move the wheels oscillatively about an axis located between the pair of axles and means for varying the distance between the axles, by varying the oscillatory supports.

12. In a tractor having wheels mounted on axles, a frame comprising arms having oscillatory supports at one end and having bearings at the other ends for the axles of the truck and means for changing the distance between the oscillatory centers of said supports.

13. In a tractor having wheels mounted on axles, a frame comprising arms having oscillatory supports at one end and bearings at the other ends in which the axles of the truck are mounted, a rotating shaft means for driving the axles from said shaft, means for varying the distance between the centers of oscillation of the arms and means for limiting the oscillation of said arms.

14. In a tractor, a pair of driving sprockets, a pair of axles, a pair of traction wheels on each axle, a driven sprocket on each axle, arms oscillating about the axis of rotation of the driving sprockets and supporting the axles, means for changing the center of oscillation of the arms, and link-belts connecting the driving and the driven sprockets in pairs.

15. In a tractor, a rotating shaft, axles, traction wheels mounted on the axles, means for driving the axles from the rotating shaft, a truck-frame comprising arms having oscillatory supports at one end and bearings at the other ends in which the axles of the truck are mounted, means for limiting the oscillation of said arms, and means for varying the distance between the oscillatory centers.

16. In a tractor having wheels mounted on axles, a frame comprising arms having oscillatory supports at one end and guides at the other, and having bearings near said guides for the axles of the truck, and means for varying the distance between the bearings by correspondingly varying the distance between the centers of oscillation of the arms.

In witness whereof I have hereunto set my hand and seal at Indianapolis, Indiana, this sixteenth day of November, A. D. one thousand nine hundred and sixteen.

JAMES B. ALLFREE. [L. S.]